United States Patent
Fenghai et al.

(10) Patent No.: US 11,112,998 B2
(45) Date of Patent: Sep. 7, 2021

(54) OPERATION INSTRUCTION SCHEDULING METHOD AND APPARATUS FOR NAND FLASH MEMORY DEVICE

(71) Applicant: DERA CO., LTD, Beijing (CN)

(72) Inventors: Wang Fenghai, Beijing (CN); Xia Jiexu, Beijing (CN); Wang Song, Beijing (CN); Yang Ji, Beijing (CN); Zhang Jiantao, Beijing (CN)

(73) Assignee: DERA CO., LTD., Beijing (CN)

( * ) Notice: Subject to any disclaimer, the term of this patent is extended or adjusted under 35 U.S.C. 154(b) by 127 days.

(21) Appl. No.: 16/467,107

(22) PCT Filed: Dec. 7, 2017

(86) PCT No.: PCT/CN2017/114939
§ 371 (c)(1),
(2) Date: Jul. 22, 2019

(87) PCT Pub. No.: WO2018/103685
PCT Pub. Date: Jun. 14, 2018

(65) Prior Publication Data
US 2019/0354317 A1 Nov. 21, 2019

(30) Foreign Application Priority Data
Dec. 8, 2016 (CN) .......................... 201611121866.3

(51) Int. Cl.
*G06F 12/00* (2006.01)
*G06F 3/06* (2006.01)
(52) U.S. Cl.
CPC .......... *G06F 3/0659* (2013.01); *G06F 3/0611* (2013.01); *G06F 3/0679* (2013.01)
(58) Field of Classification Search
None
See application file for complete search history.

(56) References Cited

U.S. PATENT DOCUMENTS

| 8,341,300 B1 | 12/2012 | Karamcheti et al. |
| 2016/0071612 A1* | 3/2016 | Takizawa ........... G11C 16/3495 365/185.11 |

(Continued)

FOREIGN PATENT DOCUMENTS

| CN | 102567120 A | 7/2012 |
| CN | 102591823 A | 7/2012 |

(Continued)

OTHER PUBLICATIONS

Chinese First Office Action, State Intellectual Property Office of the P. R. China, Chinese Patent Application No. 201611121866.3, dated Aug. 14, 2017, 6 pages.

(Continued)

*Primary Examiner* — Jason W Blust
(74) *Attorney, Agent, or Firm* — Taft Stettinius & Hollister LLP; Stephen F. Rost

(57) ABSTRACT

The present invention discloses an operation instruction scheduling method and device for a NAND flash memory device. The method comprises: performing task decomposition on the operation instruction of the NAND flash memory device, and sending an obtained task to a corresponding task queue; sending a current task to a corresponding arbitration queue according to a task type of the current task in the task queue; and scheduling a NAND interface for a to-be-executed task in the arbitration queue according to priority information of the arbitration queue. Embodiments of the present invention can efficiently realize operation instruction scheduling of a NAND flash memory device, improve flexibility of operation instruction scheduling of the NAND flash memory device, and improve overall performance of the NAND flash memory device.

16 Claims, 6 Drawing Sheets

(56) References Cited

U.S. PATENT DOCUMENTS

| | | | |
|---|---|---|---|
| 2016/0162202 A1 | 6/2016 | Singhai et al. | |
| 2016/0253091 A1* | 9/2016 | Ayyavu | G06F 3/0635 711/103 |
| 2016/0266928 A1* | 9/2016 | Rimoni | G06F 9/5011 |
| 2016/0266934 A1 | 9/2016 | Rimoni | |
| 2016/0291878 A1 | 10/2016 | Kang | |
| 2016/0299687 A1 | 10/2016 | Kim et al. | |
| 2016/0313946 A1 | 10/2016 | Zang et al. | |

FOREIGN PATENT DOCUMENTS

| | | |
|---|---|---|
| CN | 102799391 A | 11/2012 |
| CN | 103488691 A | 1/2014 |
| CN | 103778013 A | 5/2014 |
| CN | 103778013 B | 5/2014 |
| CN | 103809917 A | 5/2014 |
| CN | 105677455 A | 6/2016 |
| CN | 106547492 A | 3/2017 |
| CN | 106547492 B | 3/2017 |

OTHER PUBLICATIONS

Chinese Second Office Action, State Intellectual Property Office of the P. R. China, Chinese Patent Application No. 201611121866.3, dated Nov. 14, 2017, 7 pages.

International Search Report, State Intellectual Property Office of the P. R. China, International Patent Application No. PCT/CN2017/114939, dated Mar. 8, 2018, 4 pages.

Written Opinion of the International Searching Authority, State Intellectual Property Office of the P. R. China, International Patent Application No. PCT/CN2017/114939, dated Mar. 8, 2018, 4 pages.

European Search Report, European Patent Office, European Patent Application No. 17877644.9, dated Nov. 26, 2019, 4 pages.

Communication pursuant to Article 94(3) EPC, European Patent Office, European Patent Application No. 17877644.9, dated Mar. 10, 2020, 7 pages.

Summons to attend oral proceedings pursuant to Rule 115(1) EPC, European Patent Office, European Patent Application No. 17877644.9, dated Nov. 24, 2020, 13 pages.

* cited by examiner

OPERATION INSTRUCTION SCHEDULING METHOD AND APPARATUS FOR NAND FLASH MEMORY DEVICE

CROSS REFERENCE

This application is a U.S. national stage application under 35 U.S.C. § 371 of PCT International Application Serial No. PCT/CN2017/114939, which has an international filing date of Dec. 7, 2017, designates the United States of America, and claims the benefit of CN Application No. 201611121866.3, which was filed on Dec. 8, 2016, the disclosures of which are hereby expressly incorporated by reference in their entirety.

TECHNICAL FIELD

The present invention relates to the technical field of data storage, in particular to an operation instruction scheduling method and device for a NAND flash memory device.

BACKGROUND ART

A NAND flash memory is a storage solution better than a hard drive, and this is even more obvious in low-capacity applications not exceeding 4 GB. With a continuous pursuit of products with lower power consumption, lighter weight and better performance, NAND is proving its remarkable attraction. At present, a NAND flash memory technology is widely applied to such fields as a solid state disk. Compared with traditional mechanical hard disks, the solid state disk has been greatly improved in its access speed. The existing NAND interface speed is faster and faster, the original asynchronous mode has been changed to the existing DDR (double data rate) mode, and the latest NAND flash memory die has already reached a speed of 667 MB per second. Meanwhile, in order to improve storage capacity, a page size of a NAND flash memory becomes bigger and bigger, on the contrary, the time spent in visiting one page increases. Therefore, in order to fully utilize a bandwidth of a NAND interface, and also to increase storage capacity, one NAND interface will be connected with multiple NAND dies, in this way, a sequence of NAND instructions needs to be scheduled. On the one hand, accuracy of a scheduling strategy should be ensured, ensuring that an instruction sequence for operating NAND dies conforms to requirements, and on the other hand, performances of a NAND interface and NAND dies should be sufficiently utilized possibly.

In most operation instruction scheduling solutions of the existing NAND flash memory device, software is adopted for scheduling due to the two following major reasons: on the one hand, a scheduling strategy is relatively complex, requirements may be changed, a software solution is convenient for modification with higher flexibility; on the other hand, requirements on performance of the previous NAND interface is not high, and software is capable of satisfying requirements of performance. However, along with rapid development of the current high-capacity high-speed solid state disk, the performance of IOPS (Input/Output Operations Per Second) has reached its million level, with a delay becoming lower and lower. Therefore, performance requirements are no longer met when software is adopted to realize operation instruction scheduling of a NAND flash memory device.

SUMMARY OF THE INVENTION

The present invention provides an operation instruction scheduling method and device for a NAND flash memory device, which can efficiently realize operation instruction scheduling of a NAND flash memory device, improve flexibility of operation instruction scheduling of the NAND flash memory device, and improve overall performance of the NAND flash memory device.

In order to solve the above technical problem, the present invention adopts the following technical solution:

One aspect of the present invention provides an operation instruction scheduling method for a NAND flash memory device, including:

performing task decomposition based on the operation instruction of the NAND flash memory device, and sending an obtained task to a corresponding task queue;

sending a current task to a corresponding arbitration queue according to a task type of the current task in the task queue; and scheduling a NAND interface for a to-be-executed task in the arbitration queue according to priority information of the arbitration queue.

Wherein the step of performing task decomposition on the operation instruction of the NAND flash memory device includes:

taking a time point at which a NAND die corresponding to the operation instruction is updated from an idle state to a busy state during the execution of the operation instructions a cut-off point, and performing task decomposition on the operation instruction, wherein the NAND die corresponds to a unique task queue, so as to store a task obtained after task decomposition.

Wherein after performing task decomposition on the operation instruction of the NAND flash memory device, the method further includes:

configuring task header information for each task, wherein the task header information contains a task type identification;

the step of sending a current task to a corresponding arbitration queue according to a task type of the current task in the task queue includes:

determining a task type of the current task according to a task type identification contained in the task header information of the current task, and sending the current task to a corresponding arbitration queue according to a task type.

wherein the task type includes a non-IO task, a write IO task and a read IO task, wherein a priority of the write IO task is the same as that of the read IO task, and the priority of the non-IO task is higher than that of the write IO task and the read IO task;

the method further includes:

determining a priority of an arbitration queue according to a task priority stored in the arbitration queue.

wherein the step of scheduling a NAND interface for a to-be-executed task in the arbitration queue according to priority information of the arbitration queue includes:

judging whether a non-IO arbitration queue corresponding to the non-IO task is non-empty;

if the non-IO arbitration queue corresponding to the non-IO task is non-empty, popping a to-be-executed task from the non-IO arbitration queue, and scheduling a NAND interface for the to-be-executed task;

otherwise, popping a to-be-executed task from a write IO arbitration queue corresponding to the write IO task or from a read IO arbitration queue corresponding to the read IO task according to a preset task execution strategy, and scheduling a NAND interface for the to-be-executed task.

Wherein, before the popping a to-be-executed task from a write IO arbitration queue corresponding to the write IO task or from a read IO arbitration queue corresponding to the read IO task according to a preset task execution strategy, the method further includes:

judging whether a task is stored in the write IO arbitration queue and in the read IO arbitration queue;

if a task is stored in the write IO arbitration queue and in the read IO arbitration queue, the step of popping a to-be-executed task from a write IO arbitration queue corresponding to the write IO task or from a read IO arbitration queue corresponding to the read IO task according to a preset task execution strategy is performed, otherwise, popping a to-be-executed task directly from a non-empty arbitration queue.

Wherein the task header information further includes a read status task enabling identification;

after the scheduling a NAND interface for a to-be-executed task in the arbitration queue according to priority information of the arbitration queue, the method further includes:

judging whether the to-be-executed task is a read status task after executing the to-be-executed task;

if the to-be-executed task is a read status task, determining a usage state of a corresponding NAND die according to an execution result of the read status task, when the usage state is busy, starting a timer, triggering the read status task after a preset timing time, and sending the read status task to a corresponding arbitration queue, when the usage state is idle, returning to the usage state, so as to trigger an operation of sending a next task in the task queue to a corresponding arbitration queue;

otherwise, reading the read status task enabling identification, when the read status task enabling identification is turned on, starting a timer, triggering the read status task after a preset timing time, and sending the read status task to a corresponding arbitration queue, when the read status task enabling identification is turned off, triggering an operation of sending a next task in the task queue to a corresponding arbitration queue.

Wherein the task header information further contains an interface exclusive license identification;

after scheduling a NAND interface for a to-be-executed task in the arbitration queue according to priority information of the arbitration queue, the method further includes:

reading the interface exclusive license identification after executing the to-be-executed task, when the interface exclusive license identification is turned on, shielding a task corresponding to other NAND dies other than the current NAND die, otherwise, relieving the shielding the task corresponding to the other NAND dies, and/or triggering an operation of sending a next task in the task queue to a corresponding arbitration queue.

Wherein the task header information further includes a task identification ID;

after the scheduling a NAND interface for a to-be-executed task in the arbitration queue according to priority information of the arbitration queue, the method further includes:

after executing the to-be-executed task, monitoring and returning a task execution result, wherein the task execution result carries the task identification ID of the to-be-executed task.

Another aspect of the present invention provides an operation instruction scheduling device of a NAND flash memory device, including:

a task generation module, configured to perform task decomposition on an operation instruction of a NAND flash memory device, and send an obtained task to a corresponding task queue;

a task management module, configured to send a current task to a corresponding arbitration queue according to a task type of the current task in the task queue; and a task arbiter, configured to schedule a NAND interface for a to-be-executed task in the arbitration queue according to priority information of the arbitration queue.

Wherein the task generation module is further configured to configure task header information for each task after performing task decomposition on an operation instruction of a NAND flash memory device, wherein the task header information contains a task type identification; and the task management module is specifically configured to determine a task type of the current task according to a task type identification contained in the task header information of the current task, and send the current task to a corresponding arbitration queue according to a task type.

Compared with the prior art, the technical solution of the present invention has the following advantages:

In the present invention, through performing task decomposition on an operation instruction of a NAND flash memory device, one operation instruction is decomposed into multiple tasks, and the obtained task is sent to a corresponding task queue, and then the task is sent to a corresponding arbitration queue according to a task type of a current task in the queue, such that an arbiter schedules a NAND interface for a to-be-executed task in an arbitration queue according to a priority of an arbitration queue. Embodiments of the present invention can efficiently realize operation instruction scheduling of a NAND flash memory device, improve flexibility of operation instruction scheduling of a NAND flash memory device, and improve overall performance of the NAND flash memory device.

Other features and advantages of the present invention will be described in the subsequent description, and moreover, part of the other features and advantages will become apparent from the description, or can be understood through implementing the present invention. Objectives and other advantages of the present invention can be realized through structures specifically pointed out in the description, the claims and the drawings.

The technical solution of the present invention will be described in detail through accompanying drawings and embodiments below.

BRIEF DESCRIPTION OF THE DRAWINGS

Through reading detailed description of preferred embodiments below, other advantages and beneficial effects will become apparent for those skilled in the art. The accompanying drawings are merely for illustrating an objective of the preferred embodiments, rather than for limiting the present invention. Moreover, in the whole drawings, same reference numerals represent identical parts. In the drawings.

DETAILED DESCRIPTION OF THE EMBODIMENTS

Exemplary embodiments of the present disclosure will be described in detail below with reference to accompanying drawings. Although exemplary embodiments of the present disclosure are displayed in the accompanying drawings, it should be understood that, the present disclosure can be realized in various forms and should not be limited by embodiments described herein. On the contrary, these embodiments are provided for a more thorough understanding of the present disclosure, and for completely conveying the scope of the present disclosure to those skilled in the art.

For a better understanding of the technical solution of the present invention, a brief description will be given first on the operation instructions of a NAND flash memory.

Figure 1:
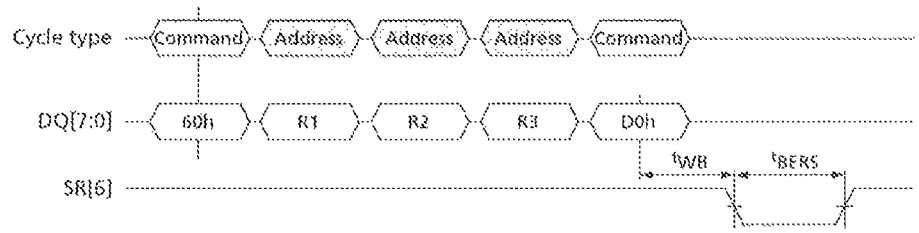
FIG. 1 is a sequence schematic diagram of a block erase operation instruction proposed in an embodiment of the present invention.

For a NAND flash memory, four basic operation instructions are available. The first basic operation instruction is block erase which takes block as a unit and executes erase operation on a whole block, with its operation sequence on a NAND interface being as shown in FIG. 1. Please refer to FIG. 1, firstly, a 60 command is sent on a NAND interface, then 3-beat address cycles, and a D0 command is sent, and then a NAND die can be started to execute an erase operation. When the erase operation is executed, the state of a NAND die becomes busy (SR[6] in the figure becomes low), and the state of the NAND die becomes idle again after waiting for a $t_{BERS}$ time. When the state is busy, the NAND die cannot receive other read and write commands, but can receive a read status operation.

Figure 2:
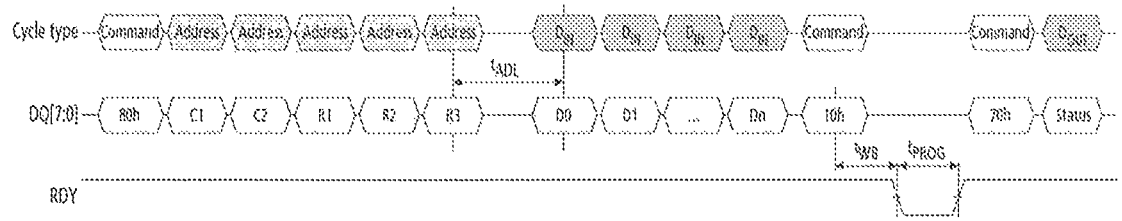
FIG. 2 is a sequence schematic diagram of a page programming operation instruction proposed in an embodiment of the present invention.

The second basic operation instruction is page program which takes page as a unit and performs a programming operation on a whole page, with its operation sequence on a NAND interface being as shown in FIG. 2. Please refer to FIG. 2, firstly, a 80 command is sent on a NAND interface, then 5-beat address cycles, data are transmitted, the data are generally data of a whole page, and the NAND dies now are mostly of 16 KB, then a 10 command is sent to determine to start a NAND die to execute a programming operation. When the programming operation is executed, the state of the NAND die becomes busy (RDY in the figure becomes low), and the state of the NAND die becomes idle again after waiting for a $t_{PROG}$ time. When the state is busy, the NAND die cannot receive other read and write commands, but can receive a read status operation.

Figure 3:
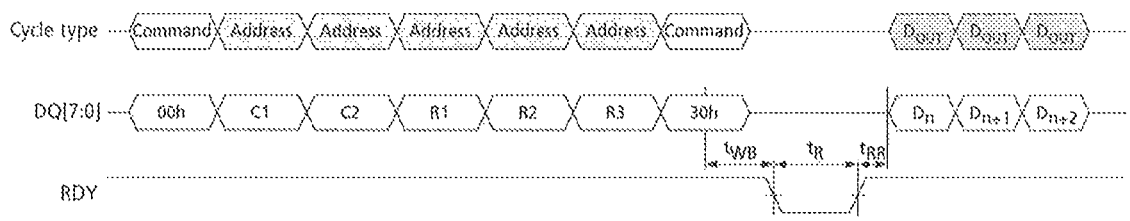
FIG. 3 is a sequence schematic diagram of a page read operation instruction proposed in an embodiment of the present invention.

The third basic operation instruction is page read which takes page as a unit and reads data from the page, with its operation sequence on a NAND interface being as shown in FIG. 3. Please refer to FIG. 3, firstly, a 00 command is sent on a NAND interface, then 5-beat address cycles, and then a 30 command is sent to determine to start a NAND die to execute a read operation, and the NAND die can read data from an internal storage unit to its internal cache register. When the read operation is executed, the state of the NAND die becomes busy (RDY in the figure becomes low), and the state of the NAND die becomes idle again after waiting for a $t_R$ time. When the state is busy, the NAND die cannot receive other read and write commands, but can receive a read status operation. When the state becomes idle from busy (the RDY in the figure becomes high from low), data can be read from a cache register through a NAND interface.

Figure 4:
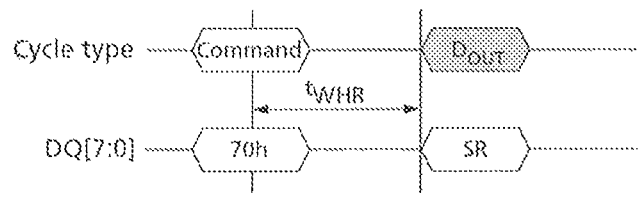
FIG. 4 is a sequence schematic diagram of a read status operation instruction proposed in an embodiment of the present invention.

The fourth basic operation instruction is a read status operation which is configured to query a state of a NAND die. The time at which a NAND die is busy varies along with different operations. Even for the same operation, the length of busy time can also be influenced by different NAND dies or even by different states of the same NAND die, therefore, a read status operation is generally used to query when the NAND die becomes idle. A read status operation is in different forms, in an embodiment of the present invention, the simplest 70 command is taken as an example for description, and its operation sequence on a NAND interface is as shown in FIG. 4. Please refer to FIG. 4, firstly, a 70 command is sent on a NAND interface, after waiting for a short time of $t_{WHR}$, the state of one byte is read through a NAND interface.

It can be understood that, besides these four basic operation instructions, other operation instructions are also available, for example, a reset operation, a read id operation, a set feature operation, etc. However, these operations are mostly low-frequency operations, or the execution time is relatively short, and for actual applications, these operations will not be a bottleneck of performance. In an embodiment of the present invention, merely basic read and write operations of a NAND flash memory device are taken as an example to explain technical solutions of the present invention, however, the present invention is not limited to these simple operations. Complex operation sequences of a NAND flash memory device, for example, a multi-plane operation, a cache operation, an interleaved die operation, etc., all belong to simple extension of the present invention, and can be realized through technical solutions of an embodiment of the present invention.

In terms of a scheduling strategy, two resources need to be managed, firstly, a NAND interface; secondly, a NAND die. The above four basic operation instructions will be described from the above two resources.

Block erase has the following features: 1. the time spent in occupying a NAND interface is relatively short and should be of a microsecond level. 2. the time spent in executing erase by a NAND die is relatively long, and for a latest flash memory die, over 10 milliseconds may be required.

Page program has the following features: 1. the time spent in occupying a NAND interface is relatively long, since a whole page of data needs to flow through a NAND interface in sequence beat by beat. 2. the time spent in executing a programming operation by a NAND die is shorter than the time spent in erase, and a latest flash memory die is almost at a level of 1 millisecond.

Page read has the following features: 1. the time spent in occupying a NAND interface is determined through the amount of read data. For a block device, the amount of read data may be an integral multiple of 512B or 4 KB. Generally speaking, the time spent in occupying a NAND interface by page read is much longer than the time spent in block erase, but may be shorter than the time spent in a page programming operation. 2. the time spent in executing a read operation by a NAND die is relatively short, and for a latest flash memory die, the time may be within 100 microseconds.

A read status operation has the following features: 1. the time spent in occupying a NAND interface is short and should be of a microsecond level. 2. the time spent in execution by a NAND die is very short.

Since the bandwidth of a NAND interface is larger than that of a NAND die, multiple NAND dies share a same NAND interface, therefore, an operation instruction scheduling method for a NAND flash memory device of the present invention is provided, so as to efficiently realize operation instruction scheduling of a NAND flash memory device, improve flexibility of operation instruction scheduling of the NAND flash memory device, and improve overall performance of the NAND flash memory device. Major implementing principles, specific embodiments and beneficial effects which can be correspondingly achieved of technical solutions of embodiments of the present application will be described in detail below in combination with accompanying drawings.

Figure 5:
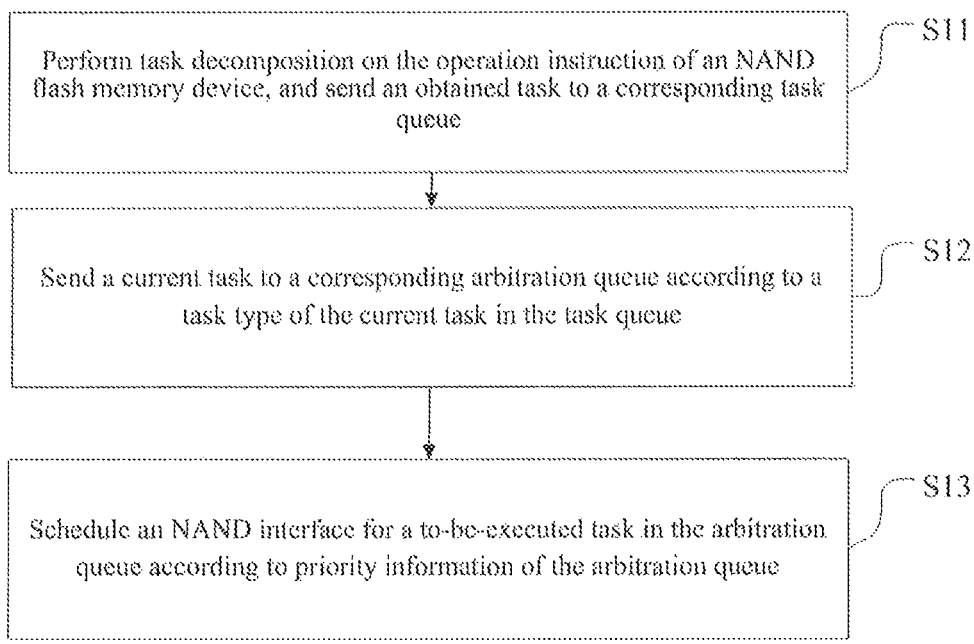
FIG. 5 is a flow chart of an operation instruction scheduling method for a NAND flash memory device in an embodiment of the present invention.

FIG. 5 is a flow chart which illustratively shows an operation instruction scheduling method for a NAND flash memory device in an embodiment of the present invention. Please refer to FIG. 5, an operation instruction scheduling method for a NAND flash memory device of an embodiment of the present invention specifically includes the following steps:

S11, performing task decomposition on an operation instruction of a NAND flash memory device, and sending an obtained task to a corresponding task queue.

In an embodiment of the present invention, each operation instruction of a NAND flash memory device corresponds to at least one execution object, that is, a target NAND die. Each NAND die maintains a task queue, and a task generation module sends a task aiming at the NAND die to a corresponding task queue after performing task decomposition on an operation instruction of a NAND flash memory device. In an embodiment of the present invention, a method of queue is adopted to realize storage of a task obtained after decomposition, thereby effectively reducing delaying of a task.

S12, sending a current task to a corresponding arbitration queue according to a task type of the current task in the task queue.

In an embodiment of the present invention, the task type includes a non-IO task, a write IO task and a read IO task. Specifically, after task decomposition, tasks of different task types are obtained, and then the current task is sent to a corresponding arbitration queue according to a task type of a current task in a task queue.

S13, scheduling a NAND interface for a to-be-executed task in the arbitration queue according to priority information of the arbitration queue.

In an operation instruction scheduling method for a NAND flash memory device provided by an embodiment of the present invention, through performing task decomposition on an operation instruction of a NAND flash memory device, one operation instruction is decomposed into multiple tasks, and the obtained task is sent to a corresponding task queue, and then the task is sent to a corresponding arbitration queue according to a task type of a current task in the queue, such that an arbiter schedules a NAND interface for a to-be-executed task in an arbitration queue according to a priority of an arbitration queue. Embodiments of the present invention can efficiently realize operation instruction scheduling of a NAND flash memory device, improve flexibility of operation instruction scheduling of a NAND flash memory device, and improve overall performance of the NAND flash memory device.

In an embodiment of the present invention, task decomposition on an operation instruction of a NAND flash memory device in step S11 is specifically realized through the following steps: taking a time point at which a NAND die corresponding to the operation instruction is updated from an idle state to a busy state during the execution of the operation instruction as a cut-off point, and performing task decomposition on the operation instruction, wherein the NAND die corresponds to a unique task queue, so as to store a task obtained after task decomposition.

In an embodiment of the present invention, in order to ensure that a sequence of instructions which operate a NAND die conforms to requirements, the following principles should be abided by when a task arbiter arbitrates a NAND interface:

1. Only when a NAND die is at an idle state, a NAND interface can be arbitrated to the die for operation;

2. When a NAND interface is occupied by a certain die, the interface can be arbitrated to other dies only after the die at least completes a current task;

3. Make as many NAND dies work at the same time as possible, in this way, a bandwidth of a NAND interface can be utilized sufficiently;

4. For the visiting of the same NAND die, a sequential order of operation must be ensured; and 5. For visiting of different NAND dies, an operation sequence among them is not ensured, if a sequence requirement is proposed on an operation, the operation sequence should be ensured by a mechanism at higher level.

According to these principles and features of the above four NAND basic operations, in an embodiment of the present invention, a time point at which a NAND die is updated from an idle state to a busy state during the execution of the operation instruction is taken as a cut-off point, and the read and write operation instructions of a NAND are decomposed into multiple tasks, with specific implementation being as follows:

1. An erase operation is decomposed into two tasks. The first task is an erase cmd task which is as follows: a 60 command is sent on a NAND interface, then 3-beat address cycles, and then a D0 command is sent to start a NAND die to execute an erase operation; the second task is a read status task which is actually a read status operation. This task is configured to query a state of a NAND die, until the NAND die becomes idle, and a pass/fail state returned by a NAND is returned to an upper level.

2. A programming operation is decomposed into two tasks. The first task is a write IO task which is as follows: a 80 command is sent on a NAND interface, then 5-beat address cycles, and then a whole page of data are transmitted on a NAND interface, and a 10 command is sent to start a NAND die to execute a programming operation; the second task is a read status task which is configured to query a state of a NAND die, until the NAND die becomes idle, and a pass/fail state returned by a NAND is returned to an upper level.

3. A page read operation is decomposed into three tasks. The first task is a load task which is as follows: a 00 command is sent on a NAND interface, then 5-beat address cycles, and then a 30 command is sent to start a NAND die to execute a read operation; the second task is a read status task which is configured to query a state of a NAND die until the NAND die becomes idle; and the third task is a read IO task, wherein read data are transmitted on a NAND interface.

Wherein the time spent in occupying a NAND interface by an erase cmd task and a load task is extremely short, and a NAND die can be started to work, therefore, they should have a higher priority to occupy a NAND interface. The time spent in occupying a NAND interface by a read status task is also extremely short, and an earlier return state of the read status task is beneficial for sending a next operation to the NAND die, therefore, the read status task also has a higher priority. In an embodiment of the present invention, these three tasks are called a non-IO task.

In an embodiment of the present invention, after performing task decomposition on an operation instruction of a NAND flash memory device, the method further includes: configuring task header information for each task, wherein the task header information contains a task type identification, and for specific details, please refer to Table 1.

Correspondingly, sending the current task to a corresponding arbitration queue according to a task type of a current task in the task queue in step S12 includes: determining a task type of the current task according to a task type identification contained in task header information of the current task, and sending the current task to a corresponding arbitration queue according to the task type.

In an embodiment of the present invention, each NAND die is provided with a task management module which is configured to maintain its own state machine module, wherein the state machine module is responsible for popping a task and corresponding header information from a task queue, applying to a NAND task arbiter to occupy a NAND interface, and waiting for a NAND interface controller to finish the task after obtaining arbitration.

Figure 6:
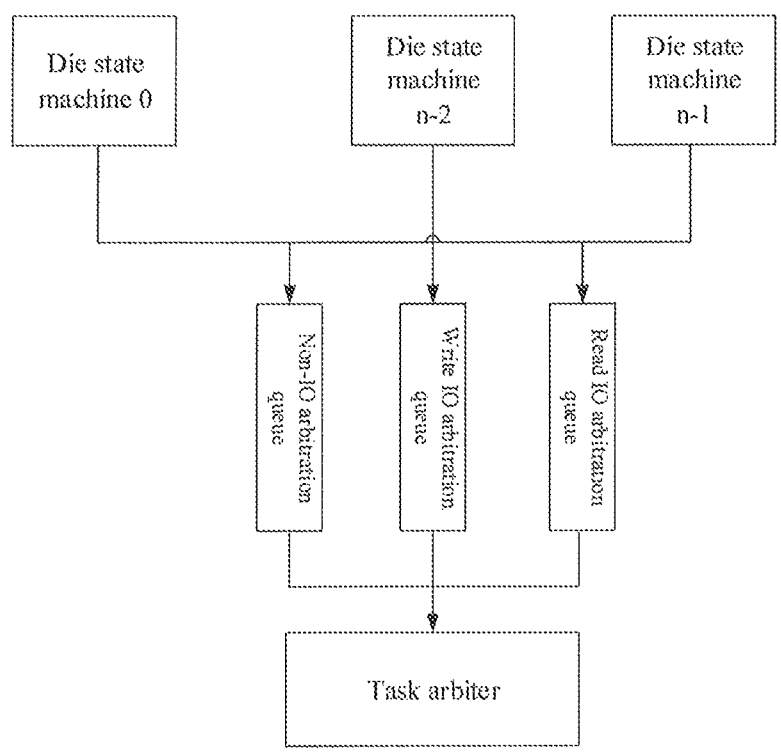
FIG. 6 is an implementing schematic diagram of an arbitration queue in an operation instruction scheduling method for a NAND flash memory device in an embodiment of the present invention.

When a die state machine applies to a NAND task arbiter, it will press tasks into different arbitration queues according to a task type in header information. Three arbitration queues are available in total, which are respectively a non-IO arbitration queue, a write IO arbitration queue and a read IO arbitration queue, as shown in FIG. 6. Please refer to FIG. 6, a die state machine will press an erase cmd task and a load task sent from software into a non-IO queue, when a timer expires, the die state machine will automatically generate a read status task, and will press the read status task into a non-IO queue. A write IO task sent from software will be pressed into a write IO queue, and a read IO task sent from software will be pressed to a read IO queue. In an embodiment of the present invention, each NAND die has its own independent state machine. The state machine is responsible for managing a state of a NAND die, and automatically initiating a read status operation according to a timer value configured by software, with no need of separately initiating a read status task, thereby efficiently realizing scheduling of an operation instruction, and effectively improving overall performance of a NAND flash memory device.

Further, the step of scheduling a NAND interface for a to-be-executed task in the arbitration queue according to priority information of the arbitration queue further includes the following steps:

judging whether a non-IO arbitration queue corresponding to the non-IO task is non-empty;

if the non-IO arbitration queue is non-empty, popping a to-be-executed task from the non-IO arbitration queue, and scheduling a NAND interface for the to-be-executed task;

if the non-IO arbitration queue is empty, judging whether a task is stored in the write IO arbitration queue and in the read IO arbitration queue, if a task is stored in the write IO arbitration queue and in the read IO arbitration queue, popping a to-be-executed task from a write IO arbitration queue corresponding to the write IO task or from a read IO arbitration queue corresponding to the read IO task according to a preset task execution strategy, otherwise, popping a to-be-executed task directly from a non-empty arbitration queue.

In an embodiment of the present invention, a task type includes a non-IO task, a write IO task and a read IO task, wherein a priority of the write IO task is the same as that of a read IO task, and the priority of the non-IO task is higher than that of the write IO task and the read IO task. An operation instruction scheduling method for a NAND flash memory device provided by an embodiment of the present invention further includes a step of determining a priority of an arbitration queue according to a priority of a task stored in the arbitration queue.

It should be noted that, since both a write IO task and a read IO task need to occupy a NAND interface for a longer time, therefore, the write IO task and the read IO task are of a lower priority. Theoretically speaking, they are of the same importance. However, in order to increase flexibility, an upper level is allowed to adjust quota of read and write, and a task execution strategy preset in an embodiment of the present invention configures weight accounted for by the write IO task and the read IO task in occupying a NAND interface. In one specific example, a register can be adopted to configure weight accounted for by the write IO task and the read IO task in occupying a NAND interface. As generally speaking, the data volume transferred by a write IO is a whole page, while the data transferred by a read IO may be possibly a part of one page, therefore, a register can be configured to allow transmission of a read IO task for multiple times after one write IO task. If no read IO task is available, then a write IO task is arbitrated continuously. In an embodiment of the present invention, a task arbiter of a NAND flash memory device is responsible for initiating arbitration on a task applied for by a NAND die, and the interface of the task arbiter is three arbitration queues. Among the three queues, a non-IO arbitration queue has the highest priority, a write IO arbitration queue and a read arbitration IO queue have the same priority, however, a register can be adopted to configure weight accounted for by the write IO arbitration queue and the read arbitration queue in occupying a NAND interface.

Figure 7:
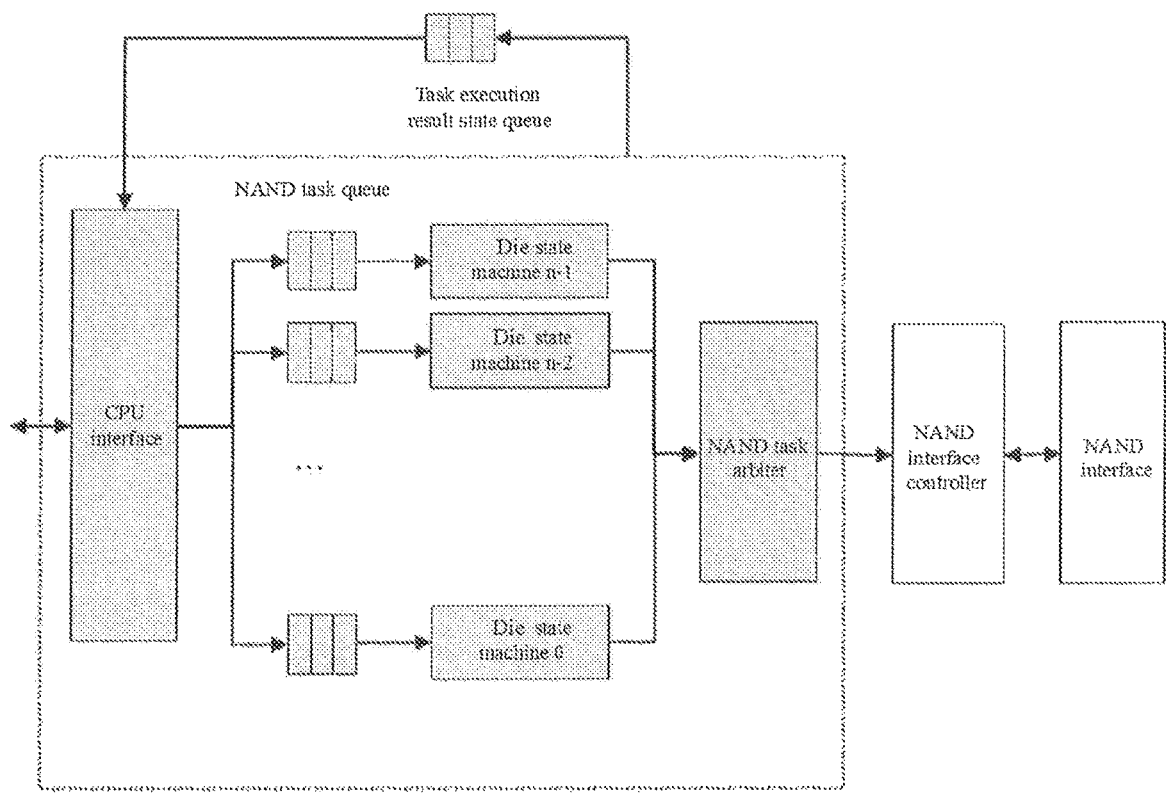
FIG. 7 is an implementing schematic diagram of an operation instruction scheduling method for a NAND flash memory device in an embodiment of the present invention.

FIG. 7 is an implementing schematic diagram of an operation instruction scheduling method for a NAND flash memory device provided in an embodiment of the present invention. Please refer to FIG. 7, wherein a CPU interface is mainly an interface through which a task generation module sends a NAND task to a task management module and receives a state of a task execution result returned by a task arbiter. The task generation module can be realized through software, and the sent NAND task is configured to control a NAND interface controller to operate on the one hand, and further contains task header information on the other hand. The header information is mainly for flexible control of a scheduling strategy of a NAND task arbiter by software. Formats and meanings of task header information are mainly as shown in the table below:

TABLE 1

Format and Meaning of Task Header Information

| Bit | Field name | Description |
|---|---|---|
| 31:16 | timer value | For a read status task, software needs to tell hardware to execute a poll status (read status) operation after waiting for how many microseconds. |
| 15:4 | task no | Task number allocated by a CPU |
| 3 | poll status enable | If the task number is 1, then a timer will be started after executing a current task, after timer expires, hardware will automatically initiate a read status operation, until NAND becomes ready; in a period of waiting for the timer, an NAND interface is allowed to be arbitrated to be used by other dies. |
| 2 | continue flag | 0: An arbiter arbitrates according to a normal strategy.<br>1: Other than NAND dies of the current task, any task of other dies will be shielded and does not participat in arbitration. |
| 1:0 | task type | 0: write IO task;<br>1: read IO task;<br>2: non-IO task |

Wherein, a task generation module is responsible for decomposing one NAND read-write operation into one or multiple tasks. As to a block erase operation, software sends an erase cmd task to hardware, in additional header information, a task type is set to be a non-IO task, poll status enable is set to be 1, and correspondingly, timer value is filled in (for example, the timer value is set to be 15 milliseconds). In the present embodiment, the task generation module does not need to send a read status task separately, this is because the read status task is initiated by the task management module itself. A task generation module only needs to set poll status enable to be 1 in task header information and set timer well. A task management module will automatically start a timer after finishing an erase cmd task, and will automatically initiate a read status task after waiting until the timer expires. For a page programming operation, a task generation module sends a write IO task to a task management module. In additional header information, a task type is set to be a write IO task, the poll status enable is set to be 1, and the timer value is filled in (for example, the timer value can be set to be 1 millisecond). In actual applications, when poll status enable in task header information of a just finished task is 1, the module will initiate a timer according to a timer value, after timer expires, a read status task will be automatically generated, and an application will be filed to a NAND task arbiter. A page read operation is divided into two software tasks, wherein the first task is a load task, in additional header information, a task type is set to be a non-IO task, the poll status enable is set to be 1, and correspondingly, the timer value is filled in (for example, the timer value is set to be 80 microseconds). A second task is a read IO task, in additional header information, a task type is set to be a read IO task, and poll status enable is set to be 0, representing that no hardware is needed to automatically initiate a read status task.

In an optional embodiment of the present invention, the task header information further includes a read status task enabling identification poll status enable. Correspondingly, after the scheduling a NAND interface for a to-be-executed task in the arbitration queue according to priority information of the arbitration queue, the method further includes: judging whether the to-be-executed task is a read status task after executing the to-be-executed task; if the to-be-executed task is a read status task, determining a usage state of a corresponding NAND die according to an execution result of the read status task, when the usage state is busy, starting a timer, triggering the read status task after a preset timing time, and sending the read status task to a corresponding arbitration queue, when the usage state is idle, returning to the usage state, so as to trigger an operation of sending a next task in the task queue to a corresponding arbitration queue; otherwise, reading the read status task enabling identification, when the read status task enabling identification is turned on, starting a timer, triggering the read status task after a preset timing time, and sending the read status task to a corresponding arbitration queue, when the read status task enabling identification is turned off, triggering an operation of sending a next task in the task queue to a corresponding arbitration queue.

A brief description will be given below on technical solutions of the present invention through a specific embodiment.

Figure 8:
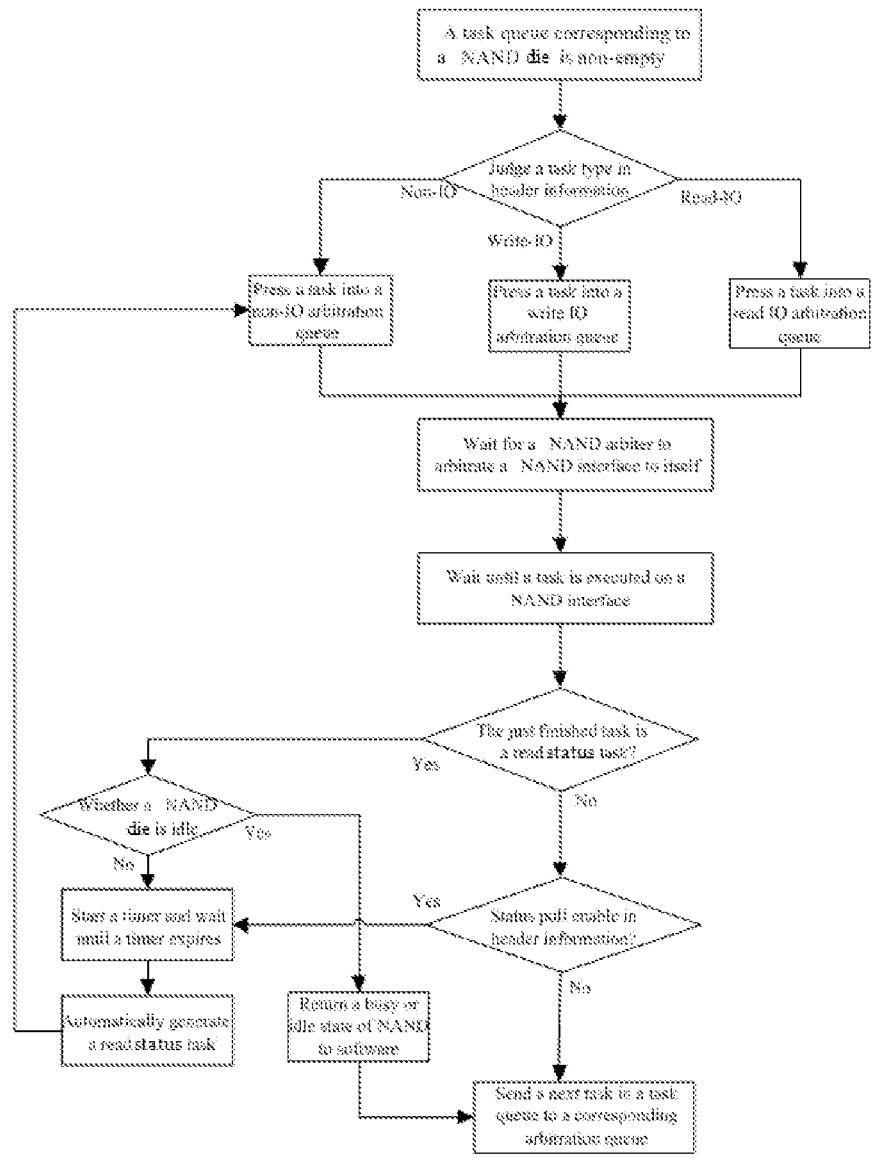
FIG. 8 is a specific implementing process of an operation instruction scheduling method for a NAND flash memory device in an embodiment of the present invention.

Please refer to FIG. 8. In an embodiment of the present invention, when a task queue corresponding to a NAND die is non-empty, a task type in a header information is judged according to task header information of a current to-be-executed task in the task queue, and the to-be-executed task is pressed into a corresponding arbitration queue according to a task type, to wait for a NAND task arbiter to arbitrate a NAND interface to a to-be-executed task, after the task is executed on a NAND interface, whether the newly executed task is a read status task is judged, if the newly executed task is a read status task, then a usage state of a corresponding NAND die is determined according to an execution result of the read status task. When the usage state is busy, a timer is started, a read status task is automatically triggered after a preset timing time timer, and the read status task is sent to a corresponding non-IO arbitration queue, when the usage state is idle, return to the usage state, and an operation of sending a next task in the task queue to a corresponding arbitration queue is triggered; if the newly executed task is not a read status task, the read status task enabling identification poll status enable is read, when the read status task enabling identification is turned on, namely, when the poll status enable is 1, a timer is started, the read status task is triggered after a preset timing time timer, and the read status task is sent to a corresponding non-IO arbitration queue, when the read status task enabling identification is turned off, namely, when the poll status enable is 0, an operation of sending a next task in the task queue to a corresponding arbitration queue is triggered.

In an optional embodiment of the present invention, the task header information further includes an interface exclusive license identification.

Correspondingly, after the scheduling a NAND interface for a to-be-executed task in the arbitration queue according to priority information of the arbitration queue, the method further includes: reading the interface exclusive license identification after executing the to-be-executed task, when the interface exclusive license identification is turned on, shielding a task corresponding to other NAND dies other than the current NAND die, otherwise, relieving the shielding a task corresponding to the other NAND dies, and/or triggering an operation of sending a next task in the task queue to a corresponding arbitration queue.

In an embodiment of the present invention, task header information contains an interface exclusive license identification continue flag, the continue flag is set to increase flexibility of scheduling, for example, for a multi-plane operation, tasks of one die need to be completed together possibly, to maintain atomicity. When the continue flag is set to be 1, it can be ensured that as long as the die is scheduled, these tasks can be finished quickly, other dies will be shielded and do not participate in arbitration.

A brief description will be given below on technical solutions of the present invention through a specific embodiment.

Figure 9:
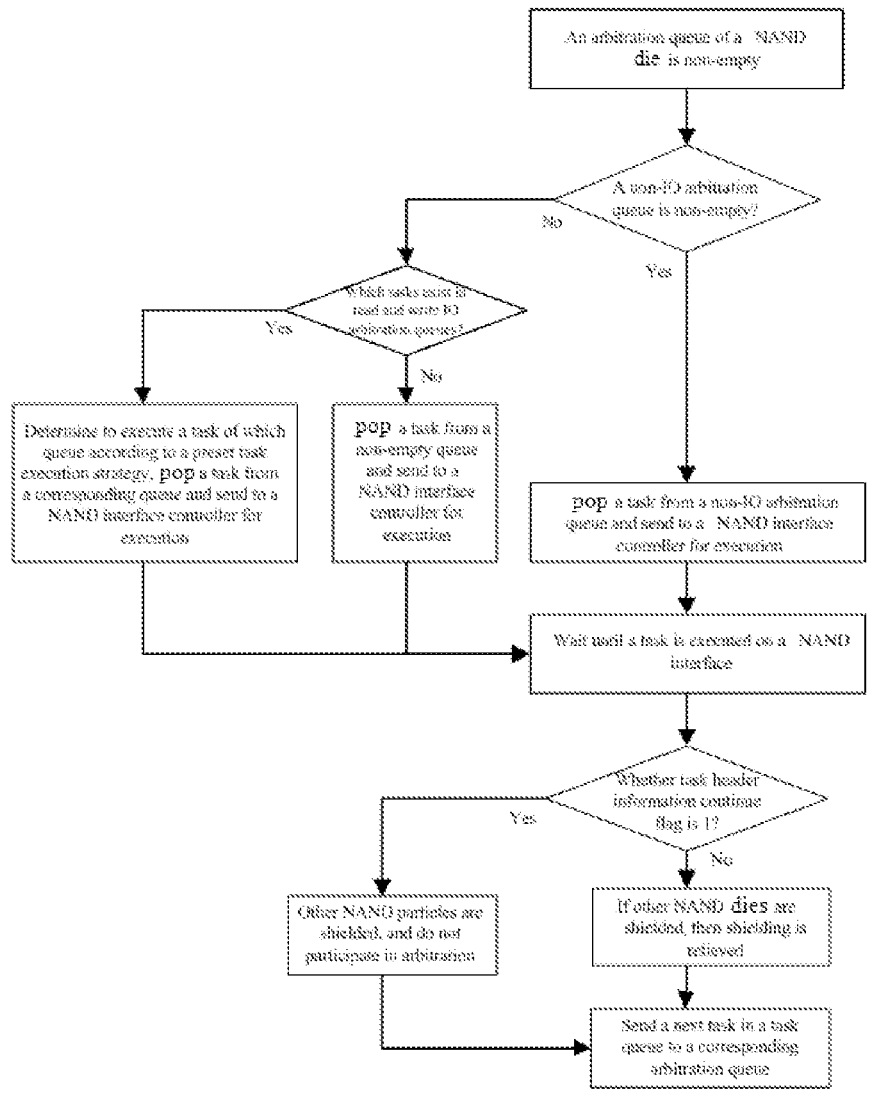
FIG. 9 is a specific implementing process of an operation instruction scheduling method for a NAND flash memory device in another embodiment of the present invention.

Please refer to FIG. 9. In an embodiment of the present invention, when an arbitration queue of a NAND die is non-empty, firstly whether a non-IO arbitration queue is non-empty is judged, if the non-IO arbitration queue is non-empty, then a task is popped from an arbitration of a non-IO arbitration queue and sent to a NAND interface controller for execution, after the task is executed on a NAND interface, an interface exclusive license identification continue flag in task header information is read, when the interface exclusive license identification is turned on, namely, when the continue flag is set to be 1, a task corresponding to other NAND dies other than the current NAND die is shielded, otherwise, if other NAND dies are shielded, then the shielding of the task corresponding to the other NAND dies is relieved, and an operation of sending a next task in the task queue to a corresponding arbitration queue is triggered. If no NAND die is shielded, then an operation of sending a next task in the task queue to a corresponding arbitration queue is directly triggered. If a non-IO arbitration queue is empty, then whether a task is stored in a write IO arbitration queue and in a read IO arbitration queue is judged, if a task is stored in a write IO arbitration queue and in a read IO arbitration queue, then a to-be-executed task is popped from a write IO arbitration queue corresponding to a write IO task or from a read IO arbitration queue corresponding to a read IO task according to a preset task execution strategy, and a NAND interface is scheduled for the to-be-executed task; otherwise, a to-be-executed task is directly popped from a non-empty arbitration queue, and a NAND interface is scheduled for the to-be-executed task.

In an optional embodiment of the present invention, the task header information further includes a task identification ID.

After scheduling a NAND interface for a to-be-executed task in the arbitration queue according to priority information of the arbitration queue, the method further includes: after executing the to-be-executed task, monitoring and returning a task execution result, wherein the task execution result carries task identification ID of the to-be-executed task.

In an embodiment of the present invention, the task header information further includes a task identification ID, namely, a task no, and the task identification ID is a task number assigned to the task by a task generation module, and is used for management of software. After executing the to-be-executed task, a task arbiter monitors and returns a task execution result, and returns the task identification ID.

In conclusion, in an operation instruction scheduling method for a NAND flash memory device provided by an embodiment of the present invention, the read-write operation of NAND is decomposed into multiple tasks with the time point at which the NAND becomes busy as a cut-off line, a task is taken as a unit for scheduling, a read status task is automatically initiated by a hardware device task management module according to a timer value configured by a task generation module. Different tasks are divided into three types according to requirements of a scheduling strategy, wherein a non-IO task has a highest priority, while read and write IO tasks are scheduled according to a weight, configured by software, accounted for by a read IO task and a write IO task in occupying a NAND interface. Embodiments of the present invention greatly reduce load of software, and efficiently realize flexible scheduling of an operation instruction of a NAND flash memory device.

It can be understood that, in an embodiment of the present invention, the number of NAND dies connected on one NAND interface is specifically limited, and can be set according to actual application requirements. Each NAND die is not limited to have only one timer, and a simple extension of technical solutions of the present invention through using multiple timers also belongs to the spirit and scope of technical solutions of the embodiments of the present invention. The number of continue flag in header information is not limited to one, while multiple continue flags can be used to represent different levels to realize simple extension of the present invention, and this also belongs to the spirit and scope of technical solutions of embodiments of the present invention.

For simple description, method embodiments are all expressed to be a series of action combinations, however, it should be known to those skilled in the art that, embodiments of the present invention are not limited by a described action sequence, since based on embodiments of the present invention, some steps can adopt other sequences or can be performed simultaneously. Secondly, those skilled in the art should also know that, embodiments described in the description all belong to preferred embodiments, and the involved actions are not necessarily required by embodiments of the present invention.

Figure 10:
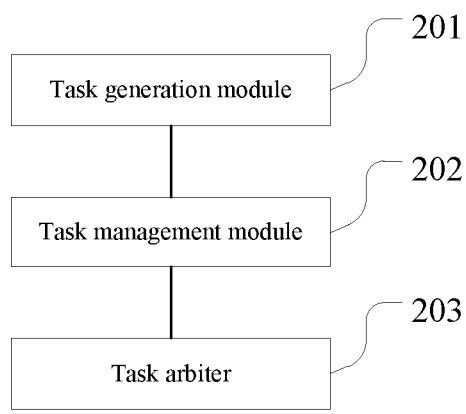
FIG. 10 is a structure diagram of an operation instruction scheduling device for a NAND flash memory device in an embodiment of the present invention.

FIG. 10 schematically shows a structural diagram of an operation instruction scheduling device for a NAND flash memory device of an embodiment of the present invention. Please refer to FIG. 10. The operation instruction scheduling device for a NAND flash memory device of an embodiment of the present invention specifically includes a task generation module 201, a task management module 202 and a task arbiter 203, wherein the task generation module 201 is configured to perform task decomposition on an operation instruction of a NAND flash memory device, and send the obtained task to a corresponding task queue; the task management module 202 is configured to send the current task to a corresponding arbitration queue according to a task type of the current task in the task queue; and the task arbiter 203 is configured to schedule a NAND interface for a to-be-executed task in the arbitration queue according to priority information of the arbitration queue.

In an optional embodiment of the present invention, the task generation module 201 is specifically configured to take a time point at which a NAND die corresponding to the operation instruction is updated from an idle state to a busy state during the execution of the operation instruction as a cut-off point, and perform task decomposition on the operation instruction;

wherein the NAND die corresponds to a unique task queue, so as to store a task obtained after task decomposition.

In an optional embodiment of the present invention, the task generation module 201 is further configured to configure a task header information for each task after performing task decomposition on an operation instruction of a NAND flash memory device, wherein the task header information contains a task type identification;

the task management module 202 is specifically configured to determine a task type of the current task according to the task type identification contained in the task header information of the current task, and send the current task to the corresponding arbitration queue according to the task type.

In an optional embodiment of the present invention, the task type includes a non-IO task, a write IO task and a read IO task, wherein a priority of the write IO task is the same as that of the read IO task, and the priority of the non-IO task is higher than that of the write IO task and the read IO task;

the task arbiter 203 is further configured to determine a priority of an arbitration queue according to a task priority stored in the arbitration queue.

Further, the task arbiter 203 includes a first judgment unit and an arbitration unit, wherein, the first judgment unit is configured to judge whether a non-IO arbitration queue corresponding to a non-IO task is non-empty; and the arbitration unit is configured to, when the judged result of a first judgment unit is that a non-IO arbitration queue is non-empty, popa to-be-executed task from the non-IO arbitration queue and schedule a NAND interface for the to-be-executed task, and further configured to, when the judged result of a first judgment unit is that a non-IO arbitration queue is empty, pop a to-be-executed task from a write IO arbitration queue corresponding to a write IO task or from a read IO arbitration queue corresponding to a read IO task according to a preset task execution strategy, and schedule a NAND interface for the to-be-executed task.

In an embodiment of the present invention, the task arbiter 203 further includes: a second judgment unit, configured to judge whether a task is stored in a write IO arbitration queue and a read IO arbitration queue before the arbitration unit pops a to-be-executed task from a write IO arbitration queue corresponding to a write IO task or from a read IO arbitration queue corresponding to a read IO task according to a preset task execution strategy;

if a task is stored in the write IO arbitration queue and the read IO arbitration queue, the arbitration unit executes an operation of popping a to-be-executed task from a write IO arbitration queue corresponding to a write IO task or from a read IO arbitration queue corresponding to a read IO task according to a preset task execution strategy, otherwise, the arbitration unit directly pops a to-be-executed task from a non-empty arbitration queue.

In an embodiment of the present invention, the task header information further contains a read status task enabling identification.

Correspondingly, the task management module 202 further includes a third judgment unit and a task triggering unit, wherein the third judgment unit is configured to judge whether the to-be-executed task is a read status task after scheduling a NAND interface for a to-be-executed task in the arbitration queue according to priority information of the arbitration queue and after executing the to-be-executed task; the task triggering unit is configured to determine a usage state of a corresponding NAND die according to an execution result of the read status task when the judged result of the third judgment unit is that the to-be-executed task is a read status task, and is configured to, when the usage state is busy, start a timer, trigger the read status task after a preset timing time, and send the read status task to a corresponding arbitration queue, and when the usage state is idle, return to the usage state, so as to trigger an operation of sending a next task in the task queue to a corresponding arbitration queue;

the task triggering unit is further configured to read the read status task enabling identification when the judged result of the third judgment unit is that the to-be-executed task is not a read status task, and is configured to, when the read status task enabling identification is turned on, start a timer, trigger the read status task after a preset timing time, and send the read status task to a corresponding arbitration queue, and when the read status task enabling identification is turned off, trigger an operation of sending a next task in the task queue to a corresponding arbitration queue.

In an embodiment of the present invention, the task header information further contains an interface exclusive license identification.

Correspondingly, the task arbiter 203 further includes an exclusive control unit, wherein the exclusive control unit is configured to read the interface exclusive license identification after scheduling a NAND interface for a to-be-executed task in the arbitration queue according to priority information of the arbitration queue and after executing the to-be-executed task, and is further configured to, when the interface exclusive license identification is turned on, shield a task corresponding to other NAND dies other than the current NAND die, otherwise, relieve the shielding the task corresponding to the other NAND dies, and/or trigger an operation of sending a next task in the task queue to a corresponding arbitration queue.

In an embodiment of the present invention, the task header information further includes a task identification ID.

Correspondingly, the task arbiter 203 further includes an execution result monitoring unit, wherein the execution result monitoring unit is configured to monitor and return a task execution result after scheduling a NAND interface for a to-be-executed task in the arbitration queue according to priority information of the arbitration queue and after executing the to-be-executed task, wherein the task execution result carries the task identification ID of the to-be-executed task.

Compared with the prior art, the technical solution of the present invention has the following advantages:

As to an operation instruction scheduling method and device for a NAND flash memory device of the present invention, through performing task decomposition on an operation instruction of a NAND flash memory device, one operation instruction is decomposed into multiple tasks, and the obtained task is sent to a corresponding task queue, and then the task is sent to a corresponding arbitration queue according to a task type of a current task in the queue, such that an arbiter schedules a NAND interface for a to-be-executed task in an arbitration queue according to a priority of an arbitration queue. In an embodiment of the present invention, a task is taken as a unit for scheduling, which can efficiently realize operation instruction scheduling of a NAND flash memory device, improve flexibility of operation instruction scheduling of a NAND flash memory device, and improve overall performance of the NAND flash memory device.

Those skilled in the art should understand that, embodiments of the present invention can be provided as methods, systems, or computer program products. Therefore, the present invention can be an entirely hardware embodiment, an entirely software embodiment, or an embodiment combining software and hardware. Moreover, the present invention can adopt a form of computer program products which can be implemented on one or more computer available storage mediums (which include but are not limited to a disk memory and an optical memory) which include computer available program codes.

The present invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine, so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner, so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device, so that a series of operational steps are performed on the computer or the other programmable data processing device to create a computer implemented process, so that the instructions executed on the computer or the other programmable device provide steps for performing the functions specified in the flow(s) of the flow chart and/or the block(s) of the block diagram.

Evidently, those skilled in the art can make various modifications and variations to the present invention without departing from the spirit and scope of the present invention. In this way, the present invention is also intended to encompass these modifications and variations thereto so long as the modifications and variations made to the present invention come into the scope of the claims appended to the present invention and their equivalents.

The invention claimed is:

1. An operation instruction scheduling method for a NAND flash memory device, comprising:
    performing task decomposition on the operation instruction of the NAND flash memory device, and sending an obtained task to a corresponding task queue;
    sending a current task to a corresponding arbitration queue according to a task type of the current task in the task queue, wherein the task type is determined according to time spent by the task in occupying a NAND interface, and a task that spends shorter time in occupying the NAND interface is assigned a higher task priority;
    determining a priority of an arbitration queue according to a task priority stored in the arbitration queue; and
    scheduling a NAND interface for a to-be-executed task in the arbitration queue according to priority information of the arbitration queue.

2. The method of claim 1, wherein the step of performing task decomposition on the operation instruction of the NAND flash memory device comprises:
    taking a time point at which a NAND die corresponding to the operation instruction is updated from an idle state to a busy state during the execution of the operation instruction as a cut-off point, and performing task decomposition on the operation instruction,
    wherein the NAND die corresponds to a unique task queue, so as to store a task obtained after task decomposition.

3. The method of claim 1, wherein after performing task decomposition on the operation instruction of the NAND flash memory device, the method further comprises:
    configuring task header information for each task, wherein the task header information contains a task type identification;
    the step of sending a current task to a corresponding arbitration queue according to a task type of the current task in the task queue comprises:
    determining a task type of the current task according to a task type identification contained in the task header information of the current task, and sending the current task to a corresponding arbitration queue according to a task type.

4. The method of claim 3, wherein the task type comprises a non-IO task, a write IO task and a read IO task, wherein a priority of the write IO task is the same as that of the read IO task, and the priority of the non-IO task is higher than that of the write IO task and the read IO task.

5. The method of claim 4, wherein the step of scheduling a NAND interface for a to-be-executed task in the arbitration queue according to priority information of the arbitration queue comprises:
    judging whether a non-IO arbitration queue corresponding to the non-IO task is non-empty;
    if the non-IO arbitration queue corresponding to the non-IO task is non-empty, popping a to-be-executed task from the non-IO arbitration queue, and scheduling a NAND interface for the to-be-executed task;
    otherwise, popping a to-be-executed task from a write IO arbitration queue corresponding to the write IO task or from a read IO arbitration queue corresponding to the read IO task according to a preset task execution strategy, and scheduling a NAND interface for the to-be-executed task.

6. The method of claim 3, wherein the task header information further comprises a read status task enabling identification;
    after the scheduling a NAND interface for a to-be-executed task in the arbitration queue according to priority information of the arbitration queue, the method further comprises:
    judging whether the to-be-executed task is a read status task after executing the to-be-executed task;
    if the to-be-executed task is a read status task, determining a usage state of a corresponding NAND die according to an execution result of the read status task, when the usage state is busy, starting a timer, triggering the read status task after a preset timing time, and sending the read status task to a corresponding arbitration queue, when the usage state is idle, returning to the usage state so as to trigger an operation of sending a next task in the task queue to a corresponding arbitration queue;
    otherwise, reading the read status task enabling identification, when the read status task enabling identification is turned on, starting a timer, triggering the read status task after a preset timing time, and sending the read status task to a corresponding arbitration queue, when the read status task enabling identification is turned off, triggering an operation of sending a next task in the task queue to a corresponding arbitration queue.

7. The method of claim 3, wherein the task header information further contains an interface exclusive license identification;

after the scheduling a NAND interface for a to-be-executed task in the arbitration queue according to priority information of the arbitration queue, the method further comprises:
  reading the interface exclusive license identification after executing the to-be-executed task, when the interface exclusive license identification is turned on, shielding a task corresponding to other NAND dies other than the current NAND die, otherwise, relieving the shielding a task corresponding to the other NAND dies, and/or triggering an operation of sending a next task in the task queue to a corresponding arbitration queue.

8. The method of claim 3, wherein the task header information further comprises a task identification ID;
  after the scheduling a NAND interface for a to-be-executed task in the arbitration queue according to priority information of the arbitration queue, the method further comprises:
  after executing the to-be-executed task, monitoring and returning a task execution result, wherein the task execution result carries the task identification ID of the to-be-executed task.

9. The method of claim 4, wherein the task header information further comprises a read status task enabling identification;
  after the scheduling a NAND interface for a to-be-executed task in the arbitration queue according to priority information of the arbitration queue, the method further comprises:
judging whether the to-be-executed task is a read status task after executing the to-be-executed task;
  if the to-be-executed task is a read status task, determining a usage state of a corresponding NAND die according to an execution result of the read status task, when the usage state is busy, starting a timer, triggering the read status task after a preset timing time, and sending the read status task to a corresponding arbitration queue, when the usage state is idle, returning to the usage state so as to trigger an operation of sending a next task in the task queue to a corresponding arbitration queue;
  otherwise, reading the read status task enabling identification, when the read status task enabling identification is turned on, starting a timer, triggering the read status task after a preset timing time, and sending the read status task to a corresponding arbitration queue, when the read status task enabling identification is turned off, triggering an operation of sending a next task in the task queue to a corresponding arbitration queue.

10. The method of claim 5, wherein the task header information further comprises a read status task enabling identification;
  after the scheduling a NAND interface for a to-be-executed task in the arbitration queue according to priority information of the arbitration queue, the method further comprises:
judging whether the to-be-executed task is a read status task after executing the to-be-executed task;
  if the to-be-executed task is a read status task, determining a usage state of a corresponding NAND die according to an execution result of the read status task, when the usage state is busy, starting a timer, triggering the read status task after a preset timing time, and sending the read status task to a corresponding arbitration queue, when the usage state is idle, returning to the usage state so as to trigger an operation of sending a next task in the task queue to a corresponding arbitration queue;
  otherwise, reading the read status task enabling identification, when the read status task enabling identification is turned on, starting a timer, triggering the read status task after a preset timing time, and sending the read status task to a corresponding arbitration queue, when the read status task enabling identification is turned off, triggering an operation of sending a next task in the task queue to a corresponding arbitration queue.

11. The method of claim 4, wherein the task header information further contains an interface exclusive license identification;
  after the scheduling a NAND interface for a to-be-executed task in the arbitration queue according to priority information of the arbitration queue, the method further comprises:
  reading the interface exclusive license identification after executing the to-be-executed task, when the interface exclusive license identification is turned on, shielding a task corresponding to other NAND dies other than the current NAND die, otherwise, relieving the shielding a task corresponding to the other NAND dies, and/or triggering an operation of sending a next task in the task queue to a corresponding arbitration queue.

12. The method of claim 5, wherein the task header information further contains an interface exclusive license identification;
  after the scheduling a NAND interface for a to-be-executed task in the arbitration queue according to priority information of the arbitration queue, the method further comprises:
  reading the interface exclusive license identification after executing the to-be-executed task, when the interface exclusive license identification is turned on, shielding a task corresponding to other NAND dies other than the current NAND die, otherwise, relieving the shielding a task corresponding to the other NAND dies, and/or triggering an operation of sending a next task in the task queue to a corresponding arbitration queue.

13. The method of claim 4, wherein the task header information further comprises a task identification ID;
  after the scheduling a NAND interface for a to-be-executed task in the arbitration queue according to priority information of the arbitration queue, the method further comprises:
  after executing the to-be-executed task, monitoring and returning a task execution result, wherein the task execution result carries the task identification ID of the to-be-executed task.

14. The method of claim 5, wherein the task header information further comprises a task identification ID;
  after the scheduling a NAND interface for a to-be-executed task in the arbitration queue according to priority information of the arbitration queue, the method further comprises:
  after executing the to-be-executed task, monitoring and returning a task execution result, wherein the task execution result carries the task identification ID of the to-be-executed task.

15. An electronic device, comprising a processor and a memory, wherein the memory stores computer instructions therein, and the processor executes the following steps by executing the computer instructions:
  performing task decomposition on an operation instruction of a NAND flash memory device, and sending an obtained task to a corresponding task queue;
  sending a current task to a corresponding arbitration queue according to a task type of the current task in the task queue, wherein the task type is determined according to time spent by the task in occupying a NAND interface, and a task that spends shorter time in occupying the NAND interface is assigned a higher task priority;

determining a priority of an arbitration queue according to a task priority stored in the arbitration queue; and scheduling a NAND interface for a to-be-executed task in the arbitration queue according to priority information of the arbitration queue.

16. The electronic device of claim 15, wherein the processor further executes the following steps:

configuring task header information for each task after performing task decomposition on an operation instruction of a NAND flash memory device, wherein the task header information contains a task type identification; and determining a task type of the current task according to a task type identification contained in the task header information of the current task, and sending the current task to a corresponding arbitration queue according to a task type.

* * * * *